INVENTOR:-
RALPH GILBERT LEY.

INVENTOR:—
RALPH GILBERT LEY

United States Patent Office 3,353,521
Patented Nov. 21, 1967

3,353,521
INTERNAL COMBUSTION PISTON ENGINES
Ralph Gilbert Ley, Stamford, England, assignor to Blackstone & Company Limited, Stamford, England
Filed Mar. 2, 1965, Ser. No. 436,621
Claims priority, application Great Britain, Mar. 3, 1964, 9,004/64
6 Claims. (Cl. 123—32)

ABSTRACT OF THE DISCLOSURE

An internal combustion engine has a cylinder head defining a part spherical combustion chamber with associated air inlet and exhaust gas passages having centre lines which are smoothly curved in the same direction and are tangential to a notional circle concentric with the longitudinal axis of the engine cylinder. Air flowing through the air inlet passage generates a vortex about the longitudinal axis of the cylinder into which a fuel injector is arranged to spray fuel. Air flowing through the air inlet passage has the same direction of rotation relative to the longitudinal axis of the cylinder as gas flowing along the exhaust gas passage and within the vortex.

---

Figure 1:
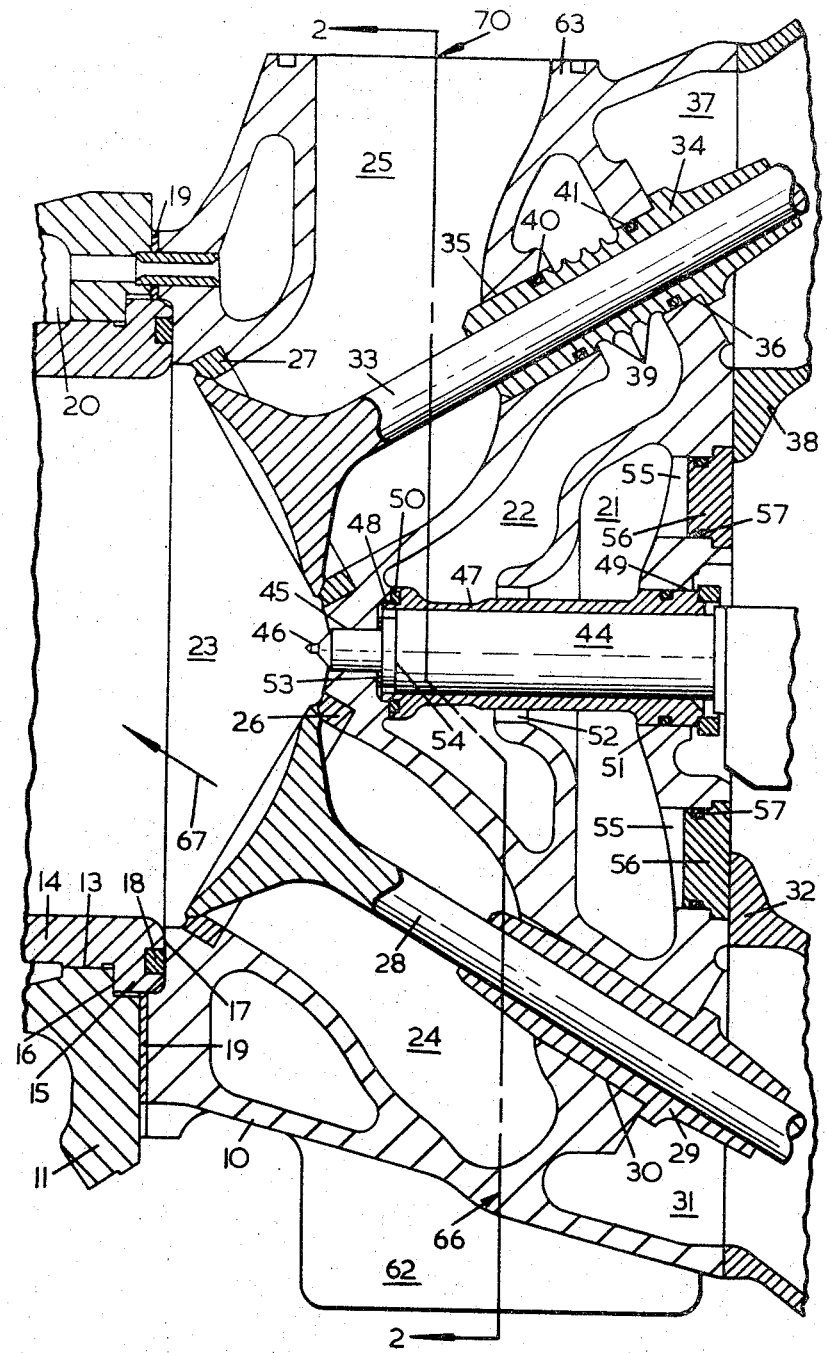

The invention relates to a cylinder head for an internal combustion piston engine. A cylinder head essentially defines a surface forming one boundary of a combustion chamber and, in the case of an engine of the overhead valve type, also defines at least one air inlet passage and at least one exhaust gas passage and is arranged to support valves for controlling these passages.

In a four stroke internal combustion piston engine the inlet and exhaust valves are usually both closed during the compression stroke and the working stroke, the inlet valve is open during the induction stroke, and the exhaust valve is open during the exhaust stroke. However, in the case of a supercharged or turbo-charged fuel injection engine, the inlet valve is usually opened just before the end of the exhaust stroke so that the flow of super-atmospheric air through the air inlet passage will scavenge the cylinder before the exhaust valve closes thereby ensuring that the cylinder will be completely filled with a fresh charge of super-atmospheric air during the induction stroke.

Whenever a charge of air flows through the air inlet passage and past the inlet valve into the cylinder, considerable turbulence is created in the cylinder. It is an object of this invention to exploit this inherent turbulence to give improved results.

According to the invention a cylinder head, for an internal combustion piston engine, has a concave substantially part-spherical combustion chamber and is adapted for connection to a cylinder of said engine such that the centre of curvature of said chamber will lie substantially on the longitudinal axis of said cylinder, an air inlet passage defined by said cylinder head for supplying air to the combustion chamber, an exhaust gas passage defined by said cylinder head for conveying exhaust gases from the combustion chamber, a seating for an inlet poppet valve provided at the junction of the air inlet passage and the combustion chamber, a seating for an exhaust poppet valve provided at the junction of the exhaust gas passage and the combustion chamber, and the inlet and exhaust gas passages are arranged so that their centre lines when viewed along the cylinder axis are each smoothly curved and directed such that their centre lines produced into the combustion chamber are tangential substantially without inflexion to notional circles concentric with the cylinder axis so that gas flowing through the inlet passage will generate a vortex about the cylinder axis, and the gas flowing along the inlet passage and along the exhaust passage and within the vortex will have the same direction of rotation. Preferably the notional circles are of the same radius. In this manner an incoming charge of air through the air inlet passage will promote a swirling turbulence generally about the longitudinal axis of the cylinder and the kinetic energy of the swirling turbulence already generated will assist the passage of exhaust gases from the cylinder into the exhaust gas passage.

According to a further feature a fuel injector may be positioned with its axis co-axial with the cylinder axis and arranged for spraying fuel into the vortex. Preferably the external manifold faces defining the ends of the inlet and exhaust gas passages remote from the combustion chamber are parallel to the cylinder axis and are inclined to each other.

Figure 2:
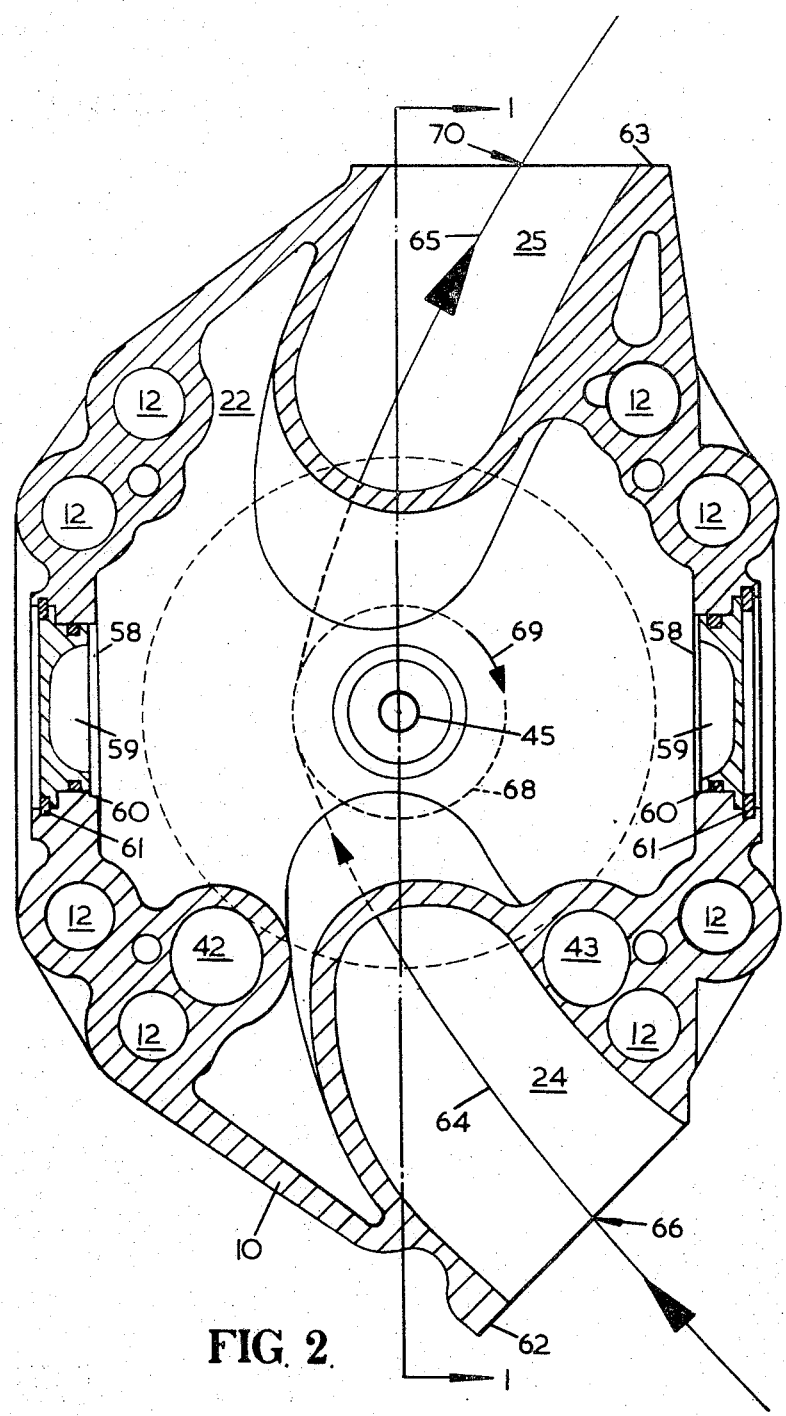

The invention is now described, by way of example only, with reference to the accompanying drawings, in which:

FIGURE 1 is a transverse section through a cylinder head as if taken along the line 1—1 of FIGURE 2, and additionally showing part of the cylinder block, part of a fuel injector, and part of two poppet valves, and FIGURE 2 is a section as if taken along the line 2—2 of FIGURE 1 but omitting the fuel injector, the poppet valves and the valve guides.

In FIGURE 1 the cylinder head casting 10 is shown secured to a cylinder block 11 by eight unshown studs which are secured at their bottom ends to the cylinder block 11 and extend through holes 12 which are shown in FIGURE 2. As the operation of these studs is well-known in the art and does not form part of the present invention, it is not necessary to consider them in any detail. However it should be noted from the arrangement of the holes 12 that the eight studs are divided into four pairs, and that this arrangement of four pairs of small studs presents an advantage over the equivalent arrangement of four large single studs in that the diameter of holes 12 is kept comparatively small and the wall thickness of the casting surrounding the holes 12 is also kept comparatively small due to the smaller size of nut required for engaging the studs.

The cylinder block 11 has a cylindrical bore 13 coacting with a wet cylinder liner 14 which is provided with an outwardly extending annular flange 15 which is located axially by an annular step 16 formed in the cylinder block 11 and an annular step 17 formed in the cylinder head casting 10. An annular gas seal 18 is arranged in an annular groove in the end face of the cylinder liner 14 for coaction with the annular step 17 to prevent the passage of gas between the cylinder liner 14 and the cylinder head casting 10. A gasket 19 is arranged between the cylinder block 11 and the cylinder head casting 10 to act as a combined gas and water seal.

The cylinder block 11 and the cylinder liner 14 define between them a space 20 into which cooling water is passed and flows through various passages into coolant chambers 21 and 22 formed in the cylinder head casting 10. However, the cooling system of the cylinder head casting forms no part of this invention and is accordingly not described in any greater detail.

The cylinder head casting 10 defines a concave substantially hemispherical combustion chamber 23 of which the centre of curvature lies on the longitudinal axis of the cylinder liner 14. An air inlet passage 24 and an exhaust gas passage 25 are also defined by the cylinder head casting and are provided with respective valve seat inserts 26 and 27. An inlet poppet valve 28 is guided for axial sliding coaxial with the valve seat insert 26 by a valve guide 29 supported by a bore 30 extending through the cylinder head casting from the air inlet passage 24 to a chamber 31 which is closed by a rocker cover 32. An exhaust poppet valve 33 is guided for axial sliding co-axial with the valve seat insert 27 by a valve guide 34 supported by aligned bores 35 and 36 extending respectively from the exhaust gas passage 25 to the coolant chamber 22 and from the latter to a chamber 37 which is closed by a rocker cover 38. In this manner a finned centre portion 39 of the valve guide 34 is exposed to the action of the cooling water in coolant chamber 22, the escape of water into the exhaust gas passage 25 or into the chamber 37 being prevented by annular seals 40 and 41 engaging the bores 35 and 36. Unshown push-rods extend through inclined bores 42 and 43 formed in the cylinder head casting as shown in FIGURE 2 for operating, in a manner well-known in the art, respective rockers arranged in the covers 32 and 38 to move the poppet valves 28 and 33 axially away from their respective valve seats 26 and 27 against the action of return springs.

A fuel injector 44 is secured to the cylinder head casting 10 in a known manner and extends through a bore 45 formed in the wall of the combustion chamber 23 so that the injector nozzle 46 is arranged intermediate the inlet valve 28 and the exhaust valve 33. The fuel injector 44 passes through a tubular sleeve 47 of which one end has a spigotal engagement 48 with the cylinder head casting 10 adjacent the bore 45, and the other end is received in a bore 49 formed in the upper wall of the cylinder head casting. Annular water seals 50 and 51 are arranged at the two junctions of the sleeve 47 with the cylinder head casting to prevent cooling water from leaking into the sleeve 47 from the coolant chambers 21 and 22 and their interconnecting passage 52. In this manner, the fuel injector 44 is isolated from the corrosive properties of the cooling water. An annular gas seal 53 is trapped between an annular ledge 54 of the fuel injector 44 and the cylinder head casting surrounding the bore 45 to prevent gas under pressure from escaping between the fuel injector and the bore 45.

The two coolant chambers 21 and 22 are formed by the use of appropriate cores during the casting of the cylinder head 10. The core for chamber 21 leaves two cored holes which are bored out as indicated at 55 and are sealed by respective plugs 56 which are each provided with an annular sealing ring 57 and are held in place by the engagement of the rocker covers 32 and 38 with the cylinder head as illustrated in FIGURE 1. The core for chamber 22 also leaves two cored holes which are bored out as indicated at 58 and are sealed by respective plugs 59 which are each provided with an annular sealing ring 60 and held in place by respective spring clips 61.

A flange 62 is provided for the attachment of an unshown air inlet manifold in a well-known manner to the air inlet passage 24, and a flange 63 is provided for the attachment of an unshown exhaust gas manifold in a well-known manner to the exhaust gas passage 25. In FIGURE 2, the longitudinal centre-line of the air inlet passage is indicated by the line 64 and the longitudinal centre-line of the exhaust gas passage is indicated by the line 65. The line 1—1 in FIGURE 2 indicates the plane that contains the axes of the poppet valves 28 and 33 and it will be appreciated that this plane is directed at right-angles to the plane of the paper.

The longitudinal centre-line 64 extends towards the valve seat 26 from the centre point 66 of the port defined by the flange 62 and the centre point 66, as seen in FIGURE 2, quite clearly lies to one side of the plane 1—1. From FIGURE 1 it will be appreciated that the centre point 66 also lies on the opposite side of the inlet valve seating 26 to the combustion chamber 23. In this manner the air inlet passage 24 guides air into the combustion chamber 23 and the cylinder 14 obliquely to the longitudinal axis of the cylinder 14 as indicated by arrow 67 in FIGURE 1, and at a tangent to a notional circle 68 described about the longitudinal axis of the cylinder 14 as shown in FIGURE 2. Due to this arrangement of the inlet air passage 24 a desirable rotational swirl is generated, as indicated by arrow 69 in FIGURE 2, about the longitudinal axis of the cylinder 14.

This rotational swirl still exists after the air charge has been compressed, fuel has been injected into the compressed air, and the working stroke has taken place. The longitudinal centre-line 65 is also a tangent to the notional circle 68 and extends from the valve seat 27 to the centre point 70 of the port defined by the flange 63. From FIGURE 2 it is clearly seen that the centre point 70 lies on the same side of the plane 1—1 as the centre point 66 and, from FIGURE 1, it will be appreciated that the centre point 70 also lies on the opposite side of the exhaust valve seat 27 to the combustion chamber 23. Due to this arrangement of the exhaust air passage 25, the burnt gases flow readily into the exhaust passage 25 as soon as the exhaust valve 33 is opened and a proportion of the rotational swirling energy of the burnt gases is utilised in urging the burnt gases through the exhaust passage.

The cylinder head illustrated is intended for use with a turbo-charged marine engine in which the inlet valve 28 is to be opened before the exhaust valve 33 closes so as to scavenge the combustion chamber 23 to remove all traces of burnt gases before the exhaust valve is closed. It will therefore be appreciated that the arrangement of the air inlet passage 24 also imparts a desirable rotational scouring action to the scavenge air and that the arrangement of the exhaust gas passage 25 assists the flow of the scavenging air and the scavenged exhaust gases from the combustion chamber.

Another advantage achieved by the present invention is that the arrangement of the air inlet passage 24 and the exhaust gas passage 25 enables their radii of curvature to be larger than the radii of curvature imposed by previously proposed arrangements. Additionally the inclination of the axes of valves 28 and 33 allows extra large ports to be employed such that the port area of the two valves shown is comparable with the port area of a four valve arrangement in a flat-ended combustion chamber of the same bore.

Although the invention has been described with reference to a cylinder head casting for a single cylinder, the casting shown could readily be extended, if desired, for two or more cylinders.

What I claim as my invention and desire to secure by Letters Patent of the United States is:

1. A cylinder head, for an internal combustion piston engine, comprising a plurality of liquid-impervious and gas-impervious walls, one of said walls defining a concave substantially part-spherical combustion chamber, said walls defining attachment points for said cylinder head to be secured to a cylinder of said engine whereby the centre of curvature of said combustion chamber will lie substantially on the longitudinal axis of said cylinder, at least one of said walls defining an air inlet passage for supplying air to said combustion chamber, at least one of said walls defining an exhaust gas passage for conveying exhaust gases from said combustion chamber, said cylinder head defining an annular inlet valve seating at the junction of said air inlet passage with said combustion chamber, said cylinder head defining an annular exhaust valve seating at the junction of said exhaust gas passage with said combustion chamber, said air inlet passage and said exhaust gas passage having respective centre lines which are smoothly curved in the same direction when viewed along said cylinder axis and that each of said passages when so regarded would have its curved centre line coincident with a continuous line having a curvature in one direction only whereby air flowing through said air inlet passage will generate a vortex about the longitudinal axis of said cylinder.

2. A cylinder head, as in claim 1, in which at least one of said walls is arranged to support a fuel injector for its axis to be co-axial with the longitudinal axis of said cylinder whereby the fuel injector will spray fuel into said vortex.

3. A cylinder head, for an internal combustion piston engine, comprising a plurality of liquid-impervious and gas-impervious walls, one of said walls defining a concave substantially part-spherical combustion chamber, said walls defining attachment points for said cylinder head to be secured to a cylinder of said engine whereby the centre of curvature of said combustion chamber will lie substantially on the longitudinal axis of said cylinder, at least one of said walls defining an air inlet passage for supplying air to said combustion chamber, at least one of said walls defining an exhaust gas passage for conveying exhaust gases from said combustion chamber, said cylinder head defining an annular inlet valve seating at the junction of said air inlet passage with said combustion chamber, said cylinder head defining an annular exhaust valve seating at the junction of said exhaust gas passage with said combustion chamber, said air inlet passage and said exhaust gas passage having respective centre lines which are smoothly curved in the same direction when viewed along said cylinder axis, said air inlet passage having an inlet end and an outlet end, said outlet end of said air inlet passage concentric with said inlet valve seating, at least one of said walls defining an inlet manifold face at the inlet end of said air inlet passage, said exhaust gas passage having an inlet end and an outlet end, said inlet end of said exhaust gas passage concentric with said exhaust valve seating, at least one of said walls defining an exhaust manifold face at the outlet end of said exhaust gas passage, said inlet manifold face inclined relatively to said exhaust manifold face, each of said air inlet and exhaust gas passages when viewed along said cylinder axis having its curved centre line coincident with a continuous line having a curvature in one direction only, whereby air flowing through said air inlet passage will generate a vortex about the longitudinal axis of said cylinder.

4. A cylinder head, as in claim 3, in which at least one of said walls is arranged to support a fuel injector for its axis to be co-axial with the longitudinal axis of said cylinder whereby the fuel injector will spray fuel into said vortex.

5. An internal combustion piston engine including a cylinder block defining a cylinder bore having a longitudinal axis, a piston coacting with said bore, means supporting said piston for reciprocation in said bore, a cylinder head secured to said cylinder block, said cylinder head comprising a plurality of liquid-impervious and gas-impervious walls, one of said cylinder head walls defining a concave substantially part-spherical combustion chamber, said longitudinal axis of said cylinder bore passing substantially through the centre of curvature of said substantially part-spherical combustion chamber, at least one of said cylinder head walls defining an air inlet passage for supplying air to said combustion chamber, at least one of said cylinder heads walls defining an exhaust gas passage for conveying exhaust gases from said combustion chamber, said cylinder head defining an annular inlet valve seating at the junction of said air inlet passage with said combustion chamber, an inlet poppet valve adapted to engage said inlet valve seating, means supporting said inlet poppet valve from said cylinder head for axial movement away from said inlet valve seating, said cylinder head defining an annular exhaust valve seating at the junction of said exhaust gas passage with said combustion chamber, an exhaust poppet valve adapted to engage said exhaust valve seating, means supporting said exhaust poppet valve from said cylinder head for axial movement away from said exhaust valve seating, said air inlet passage and said exhaust gas passage having respective centre lines which are smoothly curved in the same direction when viewed along said cylinder axis and that each of said passages when so regarded would have its curved centre line coincident with a continuous line having a curvature in one direction only, whereby air flowing through said air inlet passage will generate a vortex about the longitudinal axis of said cylinder.

6. An internal combustion piston engine, as in claim 5, in which a fuel injector is supported by at least one of said walls with its axis co-axial with the longitudinal axis of the cylinder whereby the fuel injector will spray fuel into said vortex.

References Cited

UNITED STATES PATENTS 2,318,915    5/1943    Anderson et al. _____ 123—30.2

FOREIGN PATENTS 700,364    12/1953    Great Britain.

LAURENCE M. GOODRIDGE, *Primary Examiner.*

MARK NEWMAN, *Examiner.*